United States Patent [19]

Cibura et al.

[11] Patent Number: 5,298,538
[45] Date of Patent: Mar. 29, 1994

[54] PLASTICIZING RESINS, AQUEOUS DISPERSIONS THEREOF AND METHODS OF MAKING THE SAME

[75] Inventors: Klaus Cibura, Munster, Fed. Rep. of Germany; Yali F. Hallock, Milford, Mich.; John A. Gilbert, Birmingham, Mich.; John D. McGee, Highland, Mich.

[73] Assignee: BASF Corporation, Southfield, Mich.

[21] Appl. No.: 507,927

[22] Filed: Apr. 11, 1990

[51] Int. Cl.$^5$ ................................................ C08K 3/20
[52] U.S. Cl. .................................... 523/404; 523/414; 523/415; 523/416; 523/417; 523/420; 528/111
[58] Field of Search .............. 523/414, 404, 415, 416, 523/417, 420; 260/570; 528/111

[56] References Cited

U.S. PATENT DOCUMENTS

| | | | |
|---|---|---|---|
| 4,423,166 | 12/1983 | Moriarity et al. | 523/414 |
| 4,432,850 | 2/1984 | Moriarity et al. | 204/181 C |
| 4,565,838 | 1/1986 | Parr et al. | 523/414 |
| 4,714,750 | 12/1987 | Grigsby, Jr. et al. | 528/99 |

FOREIGN PATENT DOCUMENTS 00551 2/1984 PCT Int'l Appl. .......... C08G 12/08

*Primary Examiner*—John Kight, III
*Assistant Examiner*—Richard Jones
*Attorney, Agent, or Firm*—Cary W. Brooks; Paul L. Marshall

[57] ABSTRACT

Plasticizing resins, aqueous dispersions of cationic resins, and methods of making the same for use in cathodic electrodeposition are disclosed. The resins are formed from reacting a polyoxyalkylenepolyamine, a phenol, and a formaldehyde. The reactants may further include a block building unit derived from a polyepoxide. When used in combination with other conventional electrodepositable resins, deposited films with improved mechanical properties and descreased tendency toward cratering are obtained.

17 Claims, No Drawings

PLASTICIZING RESINS, AQUEOUS DISPERSIONS THEREOF AND METHODS OF MAKING THE SAME

BACKGROUND OF THE INVENTION

The present invention relates to plasticizing resins, aqueous dispersions of the resins which are suitable for use in cathodic electrodeposition, and methods of making the same.

Historically, cathodic electrodeposition products have offered a means to provide a high degree of corrosion protection for various applications. For many applications, various mechanical film properties such as chip resistance have increased in importance. It is also desirable for the appearance of an electrodeposited film to be free from various surface defects such as those associated with cratering.

The present invention provides a means to obtain a plasticized electrodeposition paint binder with improved mechanical properties, improved chip resistance, and a descreased sensitivity toward cratering. Obtained with this invention are electrodeposited films with improved mechanical properties, improved chip resistance, improved appearance and reduced number of surface defects.

SUMMARY OF THE INVENTION

The present invention is directed to plasticizing resins derived from a polyoxyalkylenepolyamine, a formaldehyde, and a phenol (including phenolic functional oligomers). The resin may also be derived from a polyoxyalkylenepolyamine, a formaldehyde, a phenol, and a block building unit such as, for example, a polyepoxide or polyepoxide derived unit. Several methods of preparing the resin are contemplated by the present invention. A polyoxyalkylenepolyamine may be reacted directly with a formaldehyde and a phenol. Incorporating the polyepoxide are contemplated. The phenol may be reacted in excess with a polyepoxide to form a phenol adduct of the polyepoxide, and thereafter this phenol functional oligomer is reacted with a polyoxyalkylenepolyamine and formaldehyde; or an excess of polyoxyalkylenepolyamine may be reacted with a polyepoxide to form a polyoxyalkylenepolyamine adduct of a polyepoxide, and thereafter the polyoxyalkylenepolyamine adduct of the polyepoxide is reacted with formaldehyde and a phenol. The resin may be at least partially neutralized with acid to provide cationic groups and dispersed in an aqueous media.

DETAILED DESCRIPTION OF THE INVENTION

The plasticizing resins of the present invention may be prepared by reacting a polyoxyalkylenepolyamine, a formaldehyde and a phenol. When a polyepoxide is used to make a polyoxyalkylenepolyamine functional adduct, the amount of polyepoxide reacted may range from trace quantites to an amount such that the ratio of equivalents of active hydrogens in the polyoxyalkylenepolyamine, with primary amine groups being considered monofunctional, to equivalents of epoxy as low as 1.15:10. As described in prior art, resins produced solely from polyoxyalkylenepolyamine and polyepoxide having an amine to epoxide equivalent ratio greater than 1.8:1.0 are not desirable for use in Cathodic electrodeposition because of the presence of low molecular weight conductive species and the potential for free amine. In the present invention, molecular weight build up is achieved through reaction with a formaldehyde and a phenol. The high molecular weight block copolymers described by this invention are made without significant concentrations of low molecular weight conductive species or free unreacted amine independent of the amount of polyepoxide used. The molecular weight of the present invention is relatively high and preferably approaches gelation. The amount of a phenol and formaldehyde used to reach this desired near gelation state depends upon the molecular weight and viscosity of the polyoxyalkylenepolyamine or adduct thereof. If the molecular weight and viscosity of the polyoxyalkylenepolyamine or adduct thereof are relatively low, relatively large molar ratios of a phenol and formaldehde could be used. If the molecular weight and viscosity of the polyoxyalkylenepolyamine or adduct thereof are relatively high, relatively low molar ratios of formaldehyde and a phenol could be used before gelation. In every case the amount of each reactant should be chosen to produce a resin which approaches yet avoids gelation. When a polyepoxide is used as a building block with a polyoxyalkylenepolyamine, it has been found that when the ratio of equivalents of polyoxyalkylenepolyamine to equivalents of polyepoxide ranges from 1.8:1.0 to 2.2:1.0, the present invention does not have an undersirable amount of free amine nor are undesirable amounts of low molecular weight conductive species encountered so that it is undersirable for use in electrodeposition. Thus, suitable ranges of ratios of equivalents of polyoxyalkylenepolyamine to equivalents of polyepoxide include the ranges 1.15:1.0 to infinity: 1.0; 1.15:1.0 to 2.2:1.0; more than 1.80:1.0 to 2.2:1.0; more than 1.8:1.0 to 2.0:1.0; more than 1.8:1.0 to less than 1.9:1.0; more than 1.8:1.0 to infinity:1.0; and most preferably 2.0:1.0. The reaction product can be at least partially neutralized with acid to provide cationic groups and dispersed in an aqueous medium.

In general the viscosity of resins of this invention reflects resin molecular weight. Since high molecular weights are preferred, resin viscosities are naturally relatively high. In the synthesis of the block copolymers described in this invention, the relative ratios of the polyoxyalkylenepolyamine functional block, the phenol functional block, and formaldehyde which can be used before the practical viscosity limit is surpassed, depends upon the viscosity, molecular weight and functionality of the blocks used. During reaction, the viscosity and molecular weight advance over time as these blocks are linked togther. This advancement, however, can be halted by dispersion in an aqueous acidic medium. With proper control of reaction conditions, molecular weight growth can be prematurely halted if necessary, to avoid problems associated with extremes of high viscosity. The number average molecular weight of the plasticizing resin many vary depending on the molecular weight of the reactants. Preferably, the plasticizing resin has a number average molecular weight ranging from 15,000 to about 40,000 and most preferably 25,000 to 35,000.

The polyoxyalkylenepolyamine is preferably a diamine but may also be a mixture of diamines or diamines and triamines. The amount of triamine must remain low to avoid gelation. The amount of triamine may range from 0 to about 20, and preferably about 5 to 10 percent based on equivalence of reactive amine in the mixture.

One preferred polyoxyalkylenepolyamine is a diamine of structure:

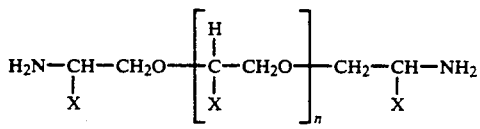

wherein X is hydrogen or $C_{1-6}$ alkyl and n is an interger in the range of 1-50. Polyoxyalkylenediamines of this type are commercially available from Texaco under the trademark "Jeffamine", for example as Jeffamine ® D-400 (having an approximate molecular weight of 400) and D-2000 (having an approximate molecular weight of 2000). Other suitable polyoxyalkylenediamines include the following which are commercially available from BASF: 3,3'-[1,2-ethanediyl-bis(oxy)]bis-1-propanamine or (4,7-dioxadecane-1,10-diamine), polyoxypropylenediamine, (Etherdiamine ® 230, 400, and 2000, having molecular weights of approximately 230, 400, and 2000, respectively), 3,3'-[1,4-butane-diylbis(oxy)]bis-1-propanamine, 4,9-dioxadodecan-1,12-diamine, 3,3'-[oxybis(2,1-ethanediyloxy)]bis-1-propanamine or (4,7,10-aminopropyl)polytetrahydrofuran 750, 1100 and 2100.

Another preferred polyoxyalkylenepolyamine is a tramine which has the general structure:

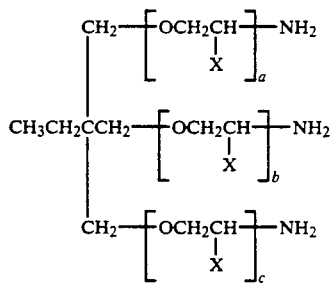

wherein X is hydrogen or $C_{1-6}$ alkyl, $a+b+c=3-30$.

One such triamine is commerically available as Jeffamine ® T-403 where $a+b+c=5.3$ and $X=CH_3$.

The polyoxyalkylenepolyamine and mixtures thereof preferably have a number average molecular weight ranging from 150-4000, and more preferably ranging from 200-2000.

Other polyoxyalkylenepolyamines contemplated include those having oxyalkyl groups which are not identical and may be selected from at least one of $C_2$-$C_8$ oxyalkyl groups, such as, for examples, Texaco's Jeffamine ® D-Series, ED-Series, C-346, DU-700, and EDR-148. Jeffamine ® D-series products are amine-terminated polypropylene glycols. Jeffamine ® ED-Series products are polyether diamines having a predominately polyethylene oxide backbone. Jeffamine ® C-346 is the bis-hydroxypropyl derivative of Jeffamine D-230, having a molecular weight of approximately 346. Jeffamine ® DU-700 is a urea condensate of Jeffamine ® D-400, having a molecular weight of approximately 820. Jeffamine ® EDR-148 is an amine terminated polyethylene glycol having a molecular weight of approximately 148.

The polyepoxides useful in the preparation of the plasticizing cationic resinous compositions of the present invention have an average functionality ranging from 1 to 2 and preferably at least about 1.4, and most preferably about 2. Epoxides having an average epoxy functionality greater than 2 may be used, however, are not preferred due to problems associated with gelation. Polyepoxides which are preferred are polyglycidyl ethers of cyclic polyosl having a molecular weight ranging from about 110 to about 5,000, preferably 228 to 2000and a weight per epoxy of 112 to 2500, preferably 170 to 1000. These may be produced by the etherification of a polyphenol with epichlorohydrin or dichlorohydrin in the presence of alkali. The polyphenol may be resorcinol, bis(4-hydroxyphenyl),2,2-propane and the like. Suitable epoxides include those available from Shell Chemicals under the registered trademark Epon ® 828, 1001f, 1004, and 1007, having weight per epoxy of 185-192, 450-500, 800-950, and 1700-2300, respectively. Polyepoxides of lower molecular weight may be chain-extended to provide polyepoxides of higher molecular weight, for example by reaction with a bisphenol.

Other suitable polyepoxides include the diglycidyl ethers of polypropylene glycol, for example those having an epoxide equivalent in the range 150-350. Polyepoxides of this type are commerically available from Dow Chemicals as DER ® 732 and 736, having weight per epoxy of 305-335 and 175-205, respectively.

The term phenol as used within this invention is meant to apply toward a broad class of phenol function materials including phenol, cresol, xylenol, naphthol, resorcinol, hydroquinone, and bis(4-hydroxyphenyl)-2,2-propane as well as a number of compounds generally referred to as bisphenols. The term is also meant to describe phenol functional oligomers which could be made by reacting polyphenols in excess with suitable block building units such as, for example, polyepoxides. The primary requirement for the material comprising the phenol or phenol functional oligomer as is applies to this invention is that is must contain at least two active hydrogens capable of reacting with the polyoxyalkylenepolyamine/formaldehyde condensation product. Other types of compounds containing similar active hydrogens which could react in a similar manner are applicable as alternatives to a phenol as described.

The formaldehyde used is preferably any of the commercially available grades of para-formaldehyde (80-95% active). The term formaldehyde is also intended to describe compounds which can provide formaldehyde functionality under reaction conditions.

The reaction may be carried out in the presence of solvent. Solvents which may be used include aliphatic alcohols, ethers, ether-alcohols, and aromatic hydrocarbons. Particularly favored are hydrophilic solvents such as glycol ethers, which are found to favorably influence dispersion properties. The level of solvent employed during reaction may vary from 0-90% of total weight of reaction product although 5-45% is preferred.

The method of introducing the resins described in this invention to an electrocoat bath is in the form of an aqueous dispersion. The invention may be dispersed in water after partial neutralization with acid. The salted amine functional resin may be dispersed directly with water or dispersed after blending with crosslinking agents appropriate for the particular application. As an alternative method, the invention may be dispersed in combination with other cationic electrodepositable compositions such as, for example, the specific principal resin emulsion described hereafter.

Acids appropriate for use with this invention include organic acids such as acetic acid, formic acid, lactic acid, and inorganic acids such as phosphoric acid. The degree of neutralization required to adequately disperse the resin in water will vary depending upon other resinous components in the dispersion. However, for most applications at least 25% total neutralization is required.

When the plasticizing resin is blended with a crosslinking agent, neutralized, and dispersed in water to form an independent dispersion, the amount of nonvolatile plasticizing resin in the total nonvolatile dispersion may range from 50 to 100%, preferably 55 to 80%, most preferably 60 to 70%. A variety of suitable crosslinking agents may be considered including blocked isocyanate corsslinkers such as, for example, the specific crosslinker agents discussed hereafter.

The amount of deionized water used in such a dispersion is generally not critical provided the viscosity of the resulting dispersions is low enough to facilitate efficient transfer and mixing. The resulting resin in water dispersions typically have average resin particle sizes below 1.0 micron and more preferably below 0.5 micron and most preferably below 0.2 micron.

To combine the resin of the present invention with other conventional cationic electrodepositable resins such as, for example, the principal resin dicussed hereafter, separate aqueous dispersions of each resin type can be blended. Alternatively, the resins can be combined and dispersed together, however, the former method is preferred. By the preferred method the separate dispersions each having a solids content from 0.5% to 50% are blended with mild agitation. The plasticizing resin of the present invention may be combined with an additional cationic resin in a dispersion wherein the nonvolatile weight of the plasticizing resin may be present in an amount ranging from about 0.5 to about 30, preferably about 1 to 25, and most preferably about 4 to about 12 percent by the nonvolatile weight of the total dispersion. Other components which may be considered for use in preparation of an electrocoat bath include pigment pastes such as, for example, the grey pigment paste described hereafter, cosolvents, curing agents, catalysts, fungicides, various additives and deionized water.

GENERAL PROCESS FOR PREPARATION OF PLASTICIZING RESINS

In general, a phenol functional material constituting a phenolic block is added to a polyoxyalkylenepolyamine or an adduct thereof. The polyoxyalkylenepolyamine is heated to 80° C. to 105° C. at which time the phenol functional material is added along with processing solvent (such as the monobutylether of ethyleneglycol). Upon dissolution of the material, para-formaldehyde is added at a temperature of 110° C. to 130° C. although lower temperatures are preferable. The mixture is heated to 150° C. and held for 2-6 hours until a stalled resin viscosity (viscosity of the resin ions longer increasing) is reached. At this point the resin is cooled to 100° C. and optionally blended with a crosslinker resin component. The mixture is dispersed in water after partial neutralization of amine functionality with an appropriate carboxylic acid.

DETAILED PROCESS FOR PREPARATION OF PLASTICIZING RESINS

A polyepoxide intermediate is made by reacting diglycidyl ether of Bisphenol A (Epon ® 828) and Bisphenol A is a ratio yielding a final EEW=510 g/eq. by methods known in the industry. Preferably, a prepolymer is made by reacting Jeffamine ® D-2000 with this epoxy intermediate in an equivalent ratio of 2.0:1.0. The epoxy is added to the Jeffamine ®, which has been heated to 90° C. Butyl Cellosolve ® (ethylene glycol monobutyl ether, available from Union Carbide Corp., Danbury, Conn.) is then added in an amount which brings process solids to 90%. The mixture is heated to 115° C. and held at this temperature for 2–3 hours until a stalled prepolymer viscosity is reached. At this point Bisphenol A is added (0.33 eq. OH per eq. of Jeffamine ®). After dissolution of Bisphenol A, p-formaldehyde is added at 120° C. (0.33 eq. per eq. of Jeffamine ®). The mixture is heated to 150° C. and held for 3–6 hours until a stalled final resin viscosity is reached.

This resin is cooled to 100° C. and blended with a TMP/TDI/alcohol crosslinker agent (described in Example (A) known in the art. The weight ratio of nonvolatile resin to nonvolatile crosslinker is 6:4. This mixture is dropped into acidified deionized water where it is dispersed. The acid/water mixture is prepared by combining lactic acid in an amount corresponding to 50% neutralization of amine with a portion of the total water to be added. The emulsion is complete after dilution with water to 35% nonvolatile.

EXAMPLE 1A

CROSSLINKER USED IN CATIONIC ELECTRODEPOSITABLE PAINT

The synthesis of the crosslinker follows well known techniques described in the art; see, for example, German Offenlegungsschrift No. 2,701,002. Briefly, appropriate molar ratios of blocking alcohol such as ethylene glycol monopropyl ether and toluene diisocyanate are first reacted and then subsequently the appropriate molar amount of the branching alcohol, trimethylolpropane, is added. The reverse order of addition can be employed so that the branching alcohol is added first, followed by the blocking alcohol.

PREPARATION OF CROSSLINKER AGENT I

A blocked isocyanate crosslinking agent (polyurethane crosslinking agent, reverse order) is prepared according to the following procedure. Slowly and with stirring in a nitrogen atmosphere is added 291 parts of an 80/20 isomeric mixture of 2,4/2,6-toluene diisocyanate, 0.08 parts of dibutyltin dilaurate and 180 parts of methyl isobutyl ketone, the temperature being maintained below 38° C. The mixture is maintained at 38° C. for an additional 30 minutes after which 75 parts of trimethylolpropane are added in portions. After allowing the reaction to proceed for about 10 hours, 175 parts of ethylene glycol monopropyl ether are added and the reaction mixture is kept at 121° C. for 1.5 hours until essentially all the isocyanate groups are reacted. This depletion is recognized from the infrared spectrum.

The normal order blocked isocyanate can be prepared by altering the foregoing order of addition pursuant to Example 1 of German Offenlegungsschrift No. 2,701,002.

EXAMPLE 1B

PREPARATION OF CROSSLINKER AGENT II

An amine blocked aliphatic crosslinker is prepared according to the following procedure. To a clean dry reaction vessel are changed 484 parts Desmodur ® N-3300 (the isocyanurate of hexamethylene diisocyanate, available from Mobay Chemicals) with 194 parts methyl isobutyl ketone. 289 parts dibutylamine are added slowly with mixing at such a rate that the exotherming reaction products remain below 75° C. 30 minute following completion of this addition, the remaining isocyanate content of the material is determined by titration. A second portion of dibutylamine is added in an amount which corresponds to 0.6 times the number of eq. of unblocked isocyanate. One hour after this addition, the isocyanate content is again determined. At this time n-butanol is added in an amount corresponding to two times the number of equivalents of unreacted isocyanate. 0.2 parts dibutyltin dilaurate is used to accelerate the final quenching of the reaction mixture. The reaction is judged to be complete upon confirmation by infrared spectroscopy that all isocyanate groups have been consumed.

EXAMPLE 2

CATIONIC ELECTRODEPOSITABLE PAINT BINDERS

The synthesis of the principal resin follows the procedures laid out in U.S. Pat. Nos. 4,780,524, and 4,661,541, the disclosures of which are incorporated herein by reference. Briefly, a diepoxide starting material is reacted with alkylphenol in a mixture of hydroxylic and lipophilic organic solvents and base catalyst at elevated temperature, preferably 100° C. to 190° C. Approximately 3 to 8, preferably about 3.5 to 4.5, equivalents of epoxy group per one equivalent of alkylphenol are used. The phenoxide (from base catalysis) reacts with the diepoxide to form monoepoxy alkoxy ether intermediate which then reacts with another diepoxide molecule to form a dimer. As mentioned above, the reaction continues so that dimers, trimers, tetramers, pentamers, and the like, of the epoxide starting material are ultimately produced. The final theoretical molecular weight of the self-additon spoxide resin resulting from this reaction is between 2200 and 3000, while the average molecular weight is up to about 7000 to 8000 because of the presence of the higher order reaction products. The epoxy functionality of this intermediate is approximately 1.7 to 2.2.

This intermediate is then further reacted with a mxiture of primary and secondary amines. The amount of amine is chosen so that the ratio of reactive amine functionality to remaining epoxy functionality on the intermediate is in the range of 0.6 to 1.1, preferably from about 0.75 to 1.0.

Preparation of Principal Resin

To a clean dry reactor is added xylene. The mixing liquid is blanketed with pure nitrogen and heated to 42° C. Solid epoxy (characteristics and weights in Table 1) is added at such a rate that the batch temperature never drops below 60° C., usually over a period of two hours. Heating is continued until 100° C. At this point, the dodecyl phenol is added and then heated to 118° C. Vacuum drying by distilation of xylene is started at this temperature and heating continued to 125° C. The pressure should be between 66 cm and 69 cm Hg (88 kP to 92 kP) at full vacuum. The drying stage should take between 1.0 and 1.5 hours. Break vacuum with pure nitrogen only. The batch is cooled to 115° C. The sample at this point should be % nonvolatiles (% N.V.)=95.0±0.5.

At 115° C. benzyldimethylamine (BDMA) is added. The peak exotherm temperature should reach 129°-132° C. The temperature is maintained at 130° C.±2° C. and the polymerization is followed by EEW (epoxy equivalent weight) titration. Every 30 minutes the reaction is sample and is stopped at an end point of 1100±10 EEW. The typical reaction time is 3 hours. Adjustments to the catalyst level may be necessary if extension period is +30 minutes from about 3 hours.

At the target EEW, the reducing solvents are added followed by diethanol amine (DEOA).

The temperature of this reaction should not exceed 132° C. Cooling may be necessary at this point with jacket or coils. A vacuum suction is started immediately after the DEOA addition and pressure is reduced to 18 inches of Hg and held for 5 minutes. The pressure is further reduced in 2 inch Hg increments followed by short holding period until 26–27 inches of Hg is reached. The batch is then cooled to 90° C. in one hour following addition of DEOA. To achieve this good reflux rate should be attained in 20-25 minutes after the DEOA addition. All solvents are returned to the reactor.

After one hour of vacuum cooling (T=90° C.), ethylene glycol monohexyl ether and isobutanol are added without breaking vacuum. The batch is cooled for 35 minutes to 59° C.±2° C. under full vacuum to achieve the target temperatures during the specified time tables.

The dimethylamino propyl amine (DMAPA) is charged as fast as possible after the 35 minute cooling period. The batch temperature is kept below 63° C. The batch is held between 54° C. and 60° C. for two hours after exotherm. Then it is heated to 90° C. over an hour and this temperature is held for one hour. The batch is cooled to 80° C.

TABLE I

| Characteristics and Weights of Ingredients | |
|---|---|
| Weight | Ingredient |
| 81.1 | Xylene |
| 33.9 | Xylene |
| 568.1 | Epon ® 1001F (EEW = 530 + 10) |
| 75.9 | Dodecyl phenol |
| 1.1 | BDMA |
| 42.1 | Ethylene glycol monobutyl ether |
| 74.7 | Xylene |
| 42.6 | DEOA |
| 40.6 | Ethylene glycol monohexyl ether |
| 107.7 | Isobutanol |
| 13.3 | DMAPA |
| 1000 | Total weight Principle Resin 70% N.V. |

Preparation of Dispersion

To the foregoing principal resin stirring at 80° C. are added lactic acid, coalescing agent Paraplex ® WP-1 (a proxpoxylated para-cresol available from Rohm & Haas, Philadelphia, Pa.), and crosslinker I as listed in Table II. Upon reaching homogeneity, this mixture is added with agitation to the combination of water portion I and Surfynol ® 104 (a proprietary mixture containing 2,4,7,9 tetramethyl-5-decyne-4,7-diol and 2-butyoxyethanol, available from Air Products and Chemicals, Inc., Allentown, Pa.). After homogenious mixing, crosslinker II is added. Once homogenious, the mixture is diluted with water portion II followed by water portion III.

TABLE II

| Emulsion | |
|---|---|
| Weight | Ingredient |
| 299.0 | Principal Resin |
| 10.6 | Lactic Acid (85%) |
| 28.0 | Nonylphenoxy polypropoxyethanol (Paraplex ® WP-1) |
| 80.6 | Crosslinker I |

TABLE II-continued

| Emulsion | |
|---|---|
| Weight | Ingredient |
| 147.1 | Water Portion I |
| 0.68 | Surfynol ® 104 (50% sol'n in 2-butoxyethanol) |
| 70.5 | Crosslinker II (80% N.V.) |
| 200.0 | Water Portion II |
| 163.4 | Water Portion III |

EXAMPLE 3

CATIONIC ELECTRODEPOSITABLE PAINT BINDERS

The synthesis of the pigment grind resin follows the techniques described below. The diglycidyl ether of Bisphenol A and another portion of Bisphenol A are adducted under heated conditions in an appropriate solvent such as toluene or xylene. To the resulting chain lengthened diepoxide in a mixture of aromatic and hydroxylic solvents is then added an equivalent of 9-amino-3,6-dioxanoan-1-ol and an equivalent of dimethylamino propyl amine per two equivalents of diepoxide groups present. After the amine termination reaction is completed by continued heating, about an equivalent of nonylphenol glycidyl ether is added for reaction with both the unreacted amine still present in the reaction mixture and with the active amine groups present in the intermediate. All reactions are carried out in organic solvent and at either ambient or elevated temperature.

PREPARATION OF GRIND RESIN

This general procedure was used to prepare a grind resin used in the pigment paste. First, 27.81 parts of the diglycidyl ether of Bisphenol A and 1.44 parts xylene were charged into a reaction vessel. The charge was heated to 82° C. under a dry nitrogen atmosphere. Next, the heating of the reaction vessel was discontinued and a charge of 5.81 parts of Bisphenol A was added, together with 0.002 parts triphenyl phosphine catalyst. The heating of the reaction vessel was then continued to a temperature of 127° C. At this time, the reaction exothermed on its own, with a peak of about 150° C.-160° C. The extension was held above 150° C. until a EEW of 350±10 achieved.

Once the above-mentioned EEW was reached, 21.08 parts ethylene glycol monobutyl ether was added to the reaction vessel and the batch was then cooled to 49° C.

After a temperature of 49° C. was achieved, a mixture of 7.77 parts of 9-amino-3,6-dioxanoan-1-ol and 4.07 parts dimethylamino propyl amine were added to the reaction vessel over a period of 6 minutes, followed by a pump flush of 0.53 parts ethylene glycol monobutyl ether. The batch exothermed to 104°-110° C., and the exotherm was held at or below 115° C. for one hour. Next, 492 parts ethylene glycol monobutyl ether was charged into the reaction vessel and the batch was cooled to 77° C. Next, 14.9 parts nonylphenol glycidyl ether was charged into the reaction vessel followed by a pump flush of 1.53 parts of ethylene glycol monobutyl ether. The batch exothermed to 88° C.-93° C., and the batch was held at this temperature for one hour. Finally, 10.03 parts ethylene glycol monobutyl ether was charged into the reaction vessel and the batch was cooled to 66° C. The resultant product was then filtered through 25 micron bags.

The non-volatile content of the grind resin prepared was determined to be 60.0%, the weight per gallon 8.53 and the viscosity was about 4900 centipoises at 25° C.

EXAMPLE 4

Preparation of a Gray Pigment Paste

To 198.3 parts of the grind resin prepared according to the foregoing procedure was mixed 11.1 parts of glacial acetic acid, 342.6 parts of deionized water, and 7.0 parts of a defoamer. To this mixture were added 12.6 parts of carbon black, 14.7 parts parts of basic white lead silicate, 21.0 parts dibutyl tin oxide, 63.0 part of clay extender, and 329.7 parts of titanium dioxide. This mixture can be adjusted to a viscosity of 70 to 80 Krebs units with more water if necessary. The mixture is comminuted by grinding to a fineness of grind of ten microns. This grey paste is stable for greater than 6 months shelf life. (The defoamer is Tristar ® antifoam 27 from Tristar Chemicals, and the clay extender is ASP200 from Englehard).

The following examples 5–7 demonstrate several plasticizing resin dispersions which can be prepared by the general process previously described.

EXAMPLE 5

Plasticizing Resin Dispersion I

In a reaction vessel 126.7 parts Epon ® 829 was combined with 36.9 parts Bisphenol A and heated to 143° C. under nitrogen blanket. The material was allowed to exotherm to 190° C. after which the temperature was maintained at 175° C. for one hour. After cooling below 160° C., 45.8 parts butyl Cellosolve ® were added yielding intermediate A.

In a second vessel 622.6 parts Jeffamine D2000 were heated to 90° C. under nitrogen atmosphere. Intermediate A, 213.4 parts, was added with 36.8 parts butyl Cellosolve ®. The mixture was heated to 115° C. for 2-3 hours to a stalled resin viscosity. At this point 24.1 parts Bishphenol A were added and mixed for 15 minutes, after which 6.3 parts p-formaldehyde were added. This mixture was held 3-6 hours to a stalled resin viscosity.

This resin was cooled to 110° C. and blended with 784 parts crosslinker "B". Crosslinker "B" is known in the art and is comprised of 290.0 parts 2,4-toluene diisocyanate 80:20 (TD-80), 198.6 parts monobutyl ether of ethylene glycol (butyl cellosolve ®), 75 parts trimethyolpropane (TMP), and reduced with 219.5 parts 2-(2-butoxyethoxy)ethanol (butyl Carbitol ®, available from Union Carbide Corporation, Danbury, Conn. Synthesis of this crosslinker follows general procedures discussed in Example 1A. After mixing until homogeneous the blend is dropped to mixture "C". Mixture "C" was comprised of 882 parts deionized water, 33 parts lactic acid, 1.4 parts Surfynol ® 104 and 1.4 parts butyl cellosolve ®. The mixture was dispersed with mixing and diluted with 1226 parts deionized water.

EXAMPLE 6

Plasticizing Resin Dispersion II

In a reaction vessel 151.8 parts Jeffamine ® D400 and 655 parts Jeffamine ® D2000 were blended and heated to 110° C. under nitrogen atmosphere. 109.1 parts polyepoxide DER ® 732, 223 parts intermediate "A" (described in Example 5) and 72 parts butyl cellosolve ® were added. This mixture was held at 110° C. for 3 hours followed by addition of 65 parts Bisphenol A, 17.1 parts p-formaldehyde, 151 parts butyl cellosolve®, and 115 parts xylene. This mixture was heated to reflux (145°-150° C.) for 2.5 hours with azeotropic removal of water.

This resin could be blended with 894 parts crosslinker "B" until homogeneous. This mixture could be dispersed by dropping into 1156 parts mixture "C" followed by dilution with 1508 parts deionized water in a manner similar to the one discussed in Example 5.

EXAMPLE 7

Plasticizing Resin Dispersion III

In a reaction vessel 168.3 parts Epon® 828 were combined with 205.4 parts Bispenol A and 20.0 parts toluene. This mixture was heated to 140° C. at which time 0.3 parts triphenyl phosphine was added. A reaction temperature of 155° C. was maintained for 2.5 hours. Upon cooling, this mixture was reduced with 105 parts toluene yielding intermediate "D".

In a second reaction vessel, 1090 parts Jeffamine® D-2000 was heated to 90° C. Intermediate "D", 498 parts, and 138 parts toluene were added followed by 27 parts p-formaldehyle. This mixture was heated to reflux with azeotropic removal of water. Reaction temperature was increased over a two hour period to 140° C. The final resin was reduced with 183 parts butyl cellosolve®.

Upon cooling to 100° C., 26.0 parts acetic acid were added. This was dispersed with vigorous mixing during addition of 2334 parts deionized water.

BATH PREPARATION

The utility of the instant invention was example by coating substrates in a bath composition prepared in parts. The first part is principal resin emulsion containing a principal resin, crosslinker, and coalescing additive in an aqueous acid medium. The second part is the plasticizing resin emulsion of the instant invention in an aqueous acid medium. The third part is a paste of grind resin, pigments, defoamers and aqueous medium. The components are combined to form an electrodeposition bath.

Combination of the emulsion, paste, flow agent, and solvents to form the coating bath follows procedures known in the art. Mixture of ingredients following a recipe to produce approximately equivalent amounts of pigment, principal resin, plasticizing resin and a nonvolatile solids content of approximately 5 to 35 percent will produce an appropriate bath. Of the nonvolatile solids content, proportions of the various ingredients will be selected so that the principal resin is about 30–55 weight percent, plasticizing resin 1 to 10 percent, the pigments are up to about 35 weight percent, the crosslinker is about 15 to 30 weight percent, the grind resin is up to about 20 percent, and the coalescing agent is about 3 to 12 percent. Preferred weight ranges for these ingredients include about 38 to 42 percent principal resin, about 3 to 10 percent plasticizing resin, about 20 to 25 percent crosslinker, about 5 to 10 percent grind resin, about 4 to 8 percent coalescing agent, and about 15 to 30 percent pigment. The preferred pH of the bath is about 5.8–6.2.

Pursuant to well-known electrodeposition techniques more fully described in R. L. Yates, "Electropainting," Robert Draper Ltd., Tedelington England (1966) and German Offenlegungsschrift 2,701,002, the coating composition in the aqueous bath described above can be applied to a metallic substrate. The metal substrate is connected to electrode leads and immersed in the above-characterized bath contained in a metallic tank which serves as the opposite electrode. Deposition is performed at a voltage of up to 400 volts for periods of up to about 5 minutes, or until a thickness of about 20 to 28 microns is achieved. The coated substrate is then removed from the tank, sprayed with ultrafilter permeate or with deionized water to remove excess bath and then placed a baking oven. The coating is baked from about 120° C. to about 200° C., preferably approximately 150° C. to 180° C. for a period of about 5 to 90 minutes, preferably, 15 to 30 minutes.

EXAMPLE 8

A control coating composition with bath P/B=0.33 was prepared by methods described (P/B refers to pigment to binder ratio).

|  | Weight | NV Weight of Resin | NV Weight of Pigment |
|---|---|---|---|
| Principal Resin Emulsion prepared as in EXAMPLE 2 | 1677 | 587 | — |
| Plasticizing Resin Dispersion prepared as in EXAMPLE 7 | — | — | — |
| Pigment Paste prepared as in EXAMPLE 4 | 505 | 73.0 | 220 |
| Deionized Water | 1818 | — | — |

Phosphated and phosphated galvanized steel panels were plated under standard conditions yielding film builds ranging between 19 and 25 microns, Wet films were baked at a temperature of 176° C. for 30 minutes.

EXAMPLE 9

A control coating composition was prepared having a bath P/B=0.24 by methods discussed.

|  | Weight | NV Weight of Resin | NV Weight of Pigment |
|---|---|---|---|
| Principal Resin Emulsion prepared as in EXAMPLE 2 | 1869 | 654 | — |
| Plasticizing Resin Dispersion prepared as in EXAMPLE 5 | — | — | — |
| Pigment Paste prepared as in EXAMPLE 4 | 390 | 56.0 | 170 |
| Deionized Water | 1741 | | |

Phosphated and phosphated galvanized steel panels were plated under standard conditions yielding film builds ranging between 19 and 25 microns. Wet films were baked at a temperature of 176° C. for 30 minutes.

EXAMPLE 10

A plasticized coating composition were prepared having a bath P/B=0.33 by methods discussed.

|  | Weight | NV Weight of Resin | NV Weight of Pigment |
|---|---|---|---|
| Principal Resin Emulsion prepared as in EXAMPLE 2 | 1593 | 558 | — |
| Plasticizing Resin Dispersion prepared as in EXAMPLE 7 | 83.7 | 29.3 | — |
| Pigment Paste prepared as in EXAMPLE 4 | 505 | 73.0 | 220 |
| Deionized Water | 1818 | | |

Phosphated and phosphated galvanized steel panels were plated under standard conditions yielding film builds ranging between 19 and 25 microns. Wet films were baked at a temperature of 176° C. for 30 minutes.

EXAMPLE 11

A plasticized coating composition having a bath P/B=0.24 was prepared by methods discussed.

|  | Weight | NV Weight of Resin | NV Weight of Pigment |
|---|---|---|---|
| Principal Resin Emulsion prepared as in EXAMPLE 2 | 1682 | 589 | — |
| Plasticizing Resin Dispersion prepared as in EXAMPLE 5 | 187 | 65.4 | — |
| Pigment Paste prepared as in EXAMPLE 4 | 390 | 56.0 | 170 |
| Deionized Water | 1741 |  |  |

Phosphated and phosphated galvanized steel panels were plated under standard conditions yielding film builds ranging between 19 and 25 microns. Wet films were baked at a temperature of 176° C. for 30 minutes.

Physical testing data are listed in Table III and Table V. R.I.=Reverse Impact (in. lbs.); M.B.=Mandrel Bend(mm), P.L.=Paint Loss (%).

The reverse impact is measured by dropping a weight from a fixed distance. The values recorded correspond to the maximum weight in pounds multiplied by the distance in inches at which no paint loss is observed. In the mandrel bend test, a coated panel is bent around a cone. The distance from the small radius of the bend that coating is removed from the panel is measured. The percent paint loss reflects the results obtained in accordance with Chrysler Motors Corporation laboratory procedure publication Number LP-463PB-51-01 which is hereby incorporated by reference.

TABLE III

| Electro-depositable Paint Binder | R.I. | M.B. | % P.L. (Phos) | % P.L. (phos. gal.) | Appearance |
|---|---|---|---|---|---|
| EXAMPLE 8 | 40 | 1.0 | 73% | 10% | craters |
| EXAMPLE 10 | 80 | 0.83 | 44% | 7.5% | smooth, glossy |

The effect of plasticizing resin described in Example 7 upon various physical properties is shown in Example 10 at a 5% level on total nonvolatile dispersion. The improvement in mechanical properties has been shown to be proportional to the percentage added as illustrated in Table IV.

TABLE IV

| % Plasticizing Resin prepared as in EXAMPLE 7 in total nonvolatile dispersion as shown in EXAMPLE 10 | Reverse Impact (in. lbs.) | Mandrel Bend (mm) |
|---|---|---|
| 2.5 | 60 | 0 |
| 5 | 80 | 0.83 |
| 10 | 120 | 0.73 |

TABLE V

| Electro-depositable Paint Binder | R.I. | M.B. (mm) | % P.L. (Phos) | % P.L. (phos. gal.) | Appearance |
|---|---|---|---|---|---|
| EXAMPLE 9 | 60 | <5.0 | 1.6 | 1.6 | Poor, severe pinholing |
| EXAMPLE 11 | 110 | 0.0 | 1.2 | 0.7 | smooth, |

TABLE V-continued

| Electro-depositable Paint Binder | R.I. | M.B. (mm) | % P.L. (Phos) | % P.L. (phos. gal.) | Appearance |
|---|---|---|---|---|---|
|  |  |  |  |  | glossy |

The effect of the plasticizing resin of the present invention described in Example 5 upon various properties is illustrated by table V at a 6% level based on the nonvolatile weight of the dispersion.

As will be apparent to those who are skilled in the art, variations and modifications can be made within the scope of the described invention. Such modifications being within the ability of those skilled in the art form a part of the present invention and are embraced by the appended claims.

We claim:

1. An aqueous dispersion comprising a plasticizing resin comprising the reaction product of:
   (1) a polyoxyalkylene polyamine, wherein the amount of triamine, if present, is no greater than 20% based on equivalence of reactive amine in the mixture;
   (2) a formaldehyde;
   (3) a phenol containing at least two active hydrogens; and
   (4) a polyepoxide; wherein the polyepoxide reacts with either the polyoxyalkylenepolyamine to form an amine-functional adduct or with the phenol to form a phenol-functional adduct or with both to form both amine-functional and phenol-functional adducts, and wherein the aqueous dispersion further comprises an additional cationic resin different from said plasticizing resin, and wherein said plasticizing resin is present in an amount ranging from 0.5 to 30 percent by nonvolatile weight of said dispersion.

2. A dispersion as set forth in claim 1 wherein said plasticizing resin is present in an amount ranging from about 1 to about 25 percent by nonvolatile weight of said dispersion.

3. A dispersion as set forth in claim 1 wherein said plasticizing resin is present in an amount ranging from about 4 to about 12 percent by nonvolatile weight of said dispersion.

4. A dispersion as set forth in claim 1 wherein said polyoxyalkylenepolyamine comprises a diamine having the general formula

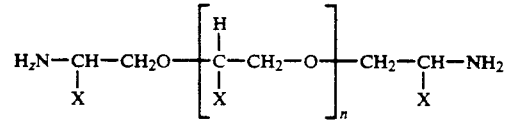

wherein x is selected from the group consisting of hydrogen and alkyl compounds having from one to six carbons and n is an integer ranging from 1 to 50.

5. A dispersion as set forth in claim 1 wherein said polyoxyalkylenepolyamine comprises a triamine having the general formula:

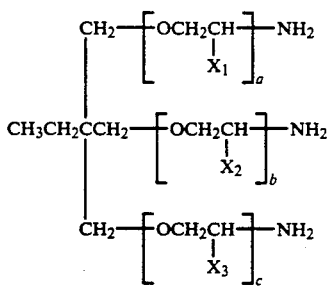

wherein $X_1$, $X_2$, $X_3$ each are selected from the group consisting of hydrogen and alkyl compounds having from one to six carbons and wherein the sum of a, b and c ranges from about 3 to about 30.

6. A dispersion as set forth in claim 1 wherein said phenol comprises a bisphenol A.

7. A dispersion as set forth in claim 1 wherein said reaction product has a number average molecular weight ranging from about 15,000 to about 40,000.

8. A dispersion as set forth in claim 1 wherein said polyepoxide comprises a polyglycidyl ether of a polyol.

9. A dispersion as set forth in claim 8 wherein said polyglycidyl ether comprises a polyglycidyl ether of bisphenol A having a number average molecular weight ranging from about 340 to about 2000.

10. A dispersion as set forth in claim 1 wherein said polyoxyalkylenepolyamine comprises polyoxypropylenediamine.

11. A dispersion as set forth in claim 1 wherein said polyepoxide is reacted with said phenol to form a phenolfunctional adduct of a polyepoxide, and thereafter said formaldehyde and said polyoxyalkylenepolyamine are reacted with said adduct.

12. A method of preparing a resin suitable to use in an electrocoating composition comprising the steps of: reacting a polyepoxide with an excess of a phenol to form a phenol-functional adduct of a polyepoxide, and thereafter, reacting a formaldehyde and a polyoxyalkylenepolyamine with said adduct.

13. An aqueous dispersion as set forth in claim 1 wherein said polyoxyalkylenepolyamine is reacted with said polyepoxide to form a polyoxyalkylenepolyamine adduct of a polyepoxide having terminal amine groups, and thereafter said formaldehyde and said phenol are reacted with said adduct.

14. A dispersion as set forth in claim 13 wherein the ratio of equivalents of active hydrogens in said polyoxyalkylenepolyamine, with primary amine groups being considered monofunctional, to equivalents of epoxy in said adduct range from about 1.15 to about 2.2:1.

15. A dispersion as set forth in claim 13 wherein the ratio of equivalents of active hydrogens in said polyoxyalkylenepolyamine, with primary amine groups being considered monofunctional, to equivalents of epoxy in said adduct ranges from about 1.80 to about 2.0:1.

16. A dispersion as set forth in claim 1 wherein said dispersion further comprises a crosslinking agent capable of reacting with said resins under curing conditions to form a cured coating.

17. A dispersion as set forth in claim 16 wherein said crosslinking agent is a blocked isocyanate crosslinking agent.

* * * * *